US006422592B2

United States Patent
Reiter et al.

(10) Patent No.: US 6,422,592 B2
(45) Date of Patent: Jul. 23, 2002

(54) AIR BAG MODULE WITH EXTERNALLY LOCATED DRIVE MECHANISM FOR THE DEPLOYMENT OPENING COVER ASSEMBLY

(75) Inventors: Thomas Reiter, Dachau; Karl Binknus, Erdweg, both of (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/798,153

(22) Filed: Mar. 2, 2001

(30) Foreign Application Priority Data

Mar. 3, 2000 (DE) .......................................... 100 10 589

(51) Int. Cl.[7] .............................................. B60R 21/20
(52) U.S. Cl. ................................ 280/728.3; 280/728.1; 280/732
(58) Field of Search .............................. 280/728.3, 732, 280/736, 728.1

(56) References Cited

U.S. PATENT DOCUMENTS

| 5,031,930 A | * | 7/1991 | Sato ........................... 280/732 |
| 5,332,257 A | * | 7/1994 | Rogers et al. .............. 280/732 |
| 5,342,090 A | * | 8/1994 | Sobczak et al. ............ 280/732 |
| 5,899,488 A | * | 5/1999 | Muller ...................... 280/728.3 |
| 5,971,431 A | * | 10/1999 | Wohllebe et al. ........... 280/732 |
| 6,053,527 A | * | 4/2000 | Gans et al. ............... 280/728.3 |
| 6,325,415 B1 | * | 12/2001 | Zelinski et al. .......... 280/743.2 |

FOREIGN PATENT DOCUMENTS

EP 0 867 346 A1 9/1998

* cited by examiner

Primary Examiner—Brian L. Johnson
Assistant Examiner—Deanna Draper
(74) Attorney, Agent, or Firm—R W Becker & Associates; R W Becker

(57) ABSTRACT

A passenger seat air bag module for supporting and deploying an air bag at a location relative to the instrument panel of a vehicle is provided, which includes a housing, an air bag sack, a gas generator for generating gas for inflating the air bag sack, and a cover element for covering a deployment opening through which the air bag sack is moved when it is deployed. To withdraw the cover element, a drive mechanism applies a pulling force to the cover element via a pulling force transmitting element. The drive mechanism includes a drive block having a plurality of paired cylinder bores and associated drive pistons and a push bar driven outwardly by the drive pistons. The outward movement of the push bar effects withdrawal of the cover element from its deployment opening covering position to its withdrawn position by the pulling force transmitting element.

11 Claims, 2 Drawing Sheets

AIR BAG MODULE WITH EXTERNALLY LOCATED DRIVE MECHANISM FOR THE DEPLOYMENT OPENING COVER ASSEMBLY

BACKGROUND OF THE INVENTION

The present invention relates to a vehicle passenger seat air bag module having a housing, an air bag sack, an air bag sack inflating device, and a deployment opening cover assembly, whereby the deployment opening cover assembly, in the event of a deployment of the air bag sack through the deployment opening, is withdrawn behind the instrument panel or dashboard by a drive mechanism and whereby the drive mechanism comprises a cylinder and piston arrangement which is powered by a pressurized fluid device separate from the air bag sack inflating device which inflates the air bag sack.

An air bag module of the general type described above is disclosed in EP 0 867 346 A1. The deployment opening cover assembly, which is built into the instrument panel, includes a pair of cover elements which are normally closed and which, in the event of an air bag deployment, are drawn apart from one another by means of a drive mechanism, each to a respective withdrawn position behind the deployment opening of the module housing. In this regard, a pull cord secured to each respective covering element acts as a pulling force transmitting element; the two pulling cords are movable via linkages into a guide cylinder located rearwardly in the interior of the module housing by actuation of two oppositely driveable rods. In one embodiment of this known air bag module, the driving of the rods is accomplished via a special gas generator.

Known air bag modules bring with them the drawback that their overall construction is complicated due to the integration in the module housing of the drive arrangement, which drives the pulling force transmitting element, and the significant effort required for the installation of such drive arrangements. In view of the fact that the opening mechanisms for the one or several cover elements for various types of motor vehicles have differing requirements, adaptation of the air bag modules to the differing layout requirements is scarcely possible or possible only with a corresponding installation effort. Due to the connection of the pulling force transmitting element to the drive arrangement in the interior of the module housing, such known configurations can lead to compromises in the sealed status of the air bag modules in the areas of the housing wall of the module housing through which the pulling force transmitting element extends.

SUMMARY OF THE INVENTION

The present invention offers a solution to the challenge of providing an air bag module having a flexible configuration for adapting the air bag module to differing vehicle constructions.

The air bag module of the present invention incorporates the basic concept that the drive mechanism for moving the deployment opening cover assembly is located in a special housing in which a plurality of drive pistons are disposed in proximity to a gas generator with the drive pistons being operable to move at least one push bar outwardly from the housing such that the push bar translates the movement imparted to it by the drive pistons onto a pulling force transmitting element trained around the housing, thereby causing the pulling force transmitting element to withdraw the deployment opening cover assembly from its deployment opening covering position.

The present invention has the advantage of offering the possibility of accommodating the drive mechanism to its installation location in the vehicle by virtue of the effective separation of the air bag containing module from the drive mechanism for driving the opening of the deployment opening cover assembly. Since the drive block of the drive mechanism is configured as a closed system, the drive mechanism can be configured, without the danger of seal leakage, for a correspondingly higher working pressure of the type which can be useful in individual cases for the opening of the deployment opening cover assembly in the instrument panel of a motor vehicle. To the extent that the drive mechanism need only be configured for the requirements of effecting the uncovering of the deployment opening, the drive mechanism can be configured in a compact and space-saving arrangement. Since the arrangement and dimensions of the selected plurality of cylinder bores with their associated drive pistons can be varied, it is possible to configure the drive arrangement in a manner which takes into account the withdrawal movement of a single cover element deployment opening cover assembly or the withdrawal movements of a multiple cover element deployment opening cover assembly, whereby the number and individual diameters of the drive pistons associated with a given cover element, and the corresponding effective drive force needed to effect withdrawal movement of the cover element, can be customized or individually accommodated. It is thus possible, with a uniform working pressure in the drive block, to transfer forces to individual cover elements which are different from the forces transferred to other individual cover elements. Individually different outward movement paths of the pulling force transmitting elements connected to the cover elements can be configured into the drive mechanism by individual specific dimensioning of the length of the cylinder bores having the drive pistons therein in combination with a travel limit construction built into the drive block for limiting the outward movement of the push bars acting on the pulling force transmitting element or pulling force transmitting elements. At the same time, the arrangement of the special drive block makes it possible to move individual cover elements in a leading or trailing manner.

In accordance with one embodiment of the air bag module of the present invention, it is provided that the special drive block is mounted on the module housing such that the advantageous possibility exists that the individually customized drive block can be connected to a more fully or, alternately, a less fully, standardized module housing.

In accordance with one embodiment of the air bag module of the present invention, it is provided that the manifold, which commonly communicates a gas generator of the drive mechanism with the cylinder bores in the drive block, has a reduced cross section portion; in this manner, it is possible to selectively set the dynamic forces which are operable on the deployment opening cover assembly.

Overflow openings are provided each in a respective cylinder bore of the drive block at a spacing from the junction of the manifold and the respective cylinder bore such that the piston driving pressurized fluid in the respective cylinder bore is released upon passage of the associated drive piston past the overflow opening. This places the respective cylinder bore in a depressurized condition and is a means by which a limit can be placed on the outward movement of the push bar connected to the associated drive piston.

The present invention provides, as another approach to limiting outward movement of the push bar in addition to, or in lieu of, the overflow openings, that the push bar, which is pushed outwardly from the drive block, is limited in its travel by an outward travel limit element which applies its travel limiting action once a predetermined outer travel limit is reached.

In view of the fact that typical deployment opening cover assemblies for motor vehicles, which operate to cover the air bag deployment opening that is located in the instrument panel, can have a considerable width, it is provided, in accordance with one embodiment of the air bag module of the present invention, that two pulling force transmitting elements are connected to the deployment opening cover assembly. It can further be provided, in accordance with the present invention, that the plurality of drive pistons are connected to the associated push bar in the area in which the pulling force transmitting element is trained over the push bar. To ensure that the cover elements of the deployment opening cover assembly are moved in a uniform manner into their respective withdrawn positions, it is provided that, within the drive block, the cylinder bores are arranged symmetrically relative to the gas generator which is located centrally in the drive block.

The present invention, in its basic configuration, is sufficient for withdrawing a single cover element deployment opening cover assembly from its deployment opening cover position, whereby the one or several pulling force transmitting elements are connected to the cover element and are trained around and fixedly connected to the module housing in a manner such that the movement of the push bar outwardly from the drive block leads to a taking up or tightening of the pulling force transmitting elements which operates to withdraw the cover element away from its deployment opening cover position in the direction of the module housing.

To the extent that the deployment opening is covered by two cover elements which are withdrawable in mutually opposite directions from one another to thereby uncover the deployment opening, it is advantageous, in accordance with one embodiment of the air bag module of the present invention, if the deployment opening cover assembly is comprised of the two cover elements and that a respective end of the pulling force transmitting element is secured to each cover element. It is similarly advantageous, in accordance with one embodiment of the air bag module of the present invention, if two push bars are provided, each movable outwardly from the housing in a direction opposite to that of the other push bar; in this configuration, each push bar can be connected, for example, to a plurality of drive pistons which are movably retained in associated cylinder bores communicated with a gas generator that provides piston driving pressurized fluid.

In connection with limiting the movement of the push bars outwardly from the drive block, which movement effects a shortening of the effective length of the pulling force transmitting element, the assembly or construction of the drive block can be reduced if a doubling up or looping back of the pulling force transmitting element is provided since the pulling force transmitting element is trained around the housing in a manner such that outward movement of the push bars leads to the creation of a loop in the pulling force transmitting element.

BRIEF DESCRIPTION OF THE DRAWINGS

The object and advantages of the present invention will be explained in more detail with the aid of the accompanying schematic drawings, in which.

DETAILED DESCRIPTION OF THE PREFERRED EMBODIMENT

Figure 1:
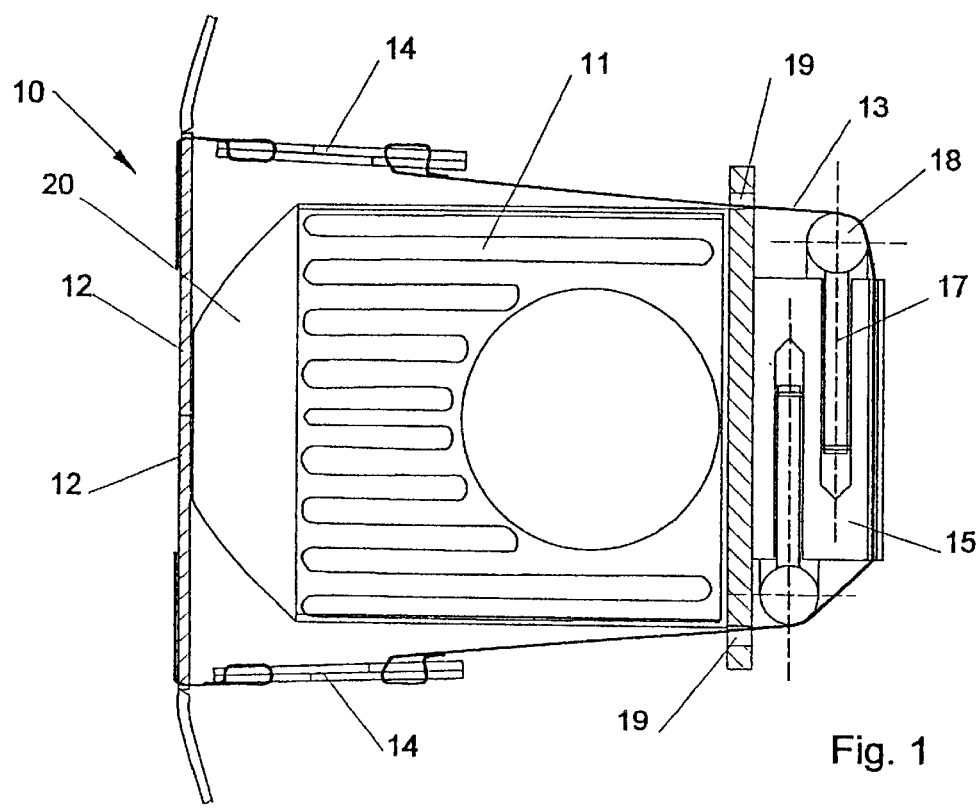
FIG. 1 is a top plan view in partial section of one embodiment of the air bag module of the present invention with its drive mechanism for driving the opening of a pair of cover elements of the air bag module and showing the drive mechanism in its non-actuated condition.
Figure 2:
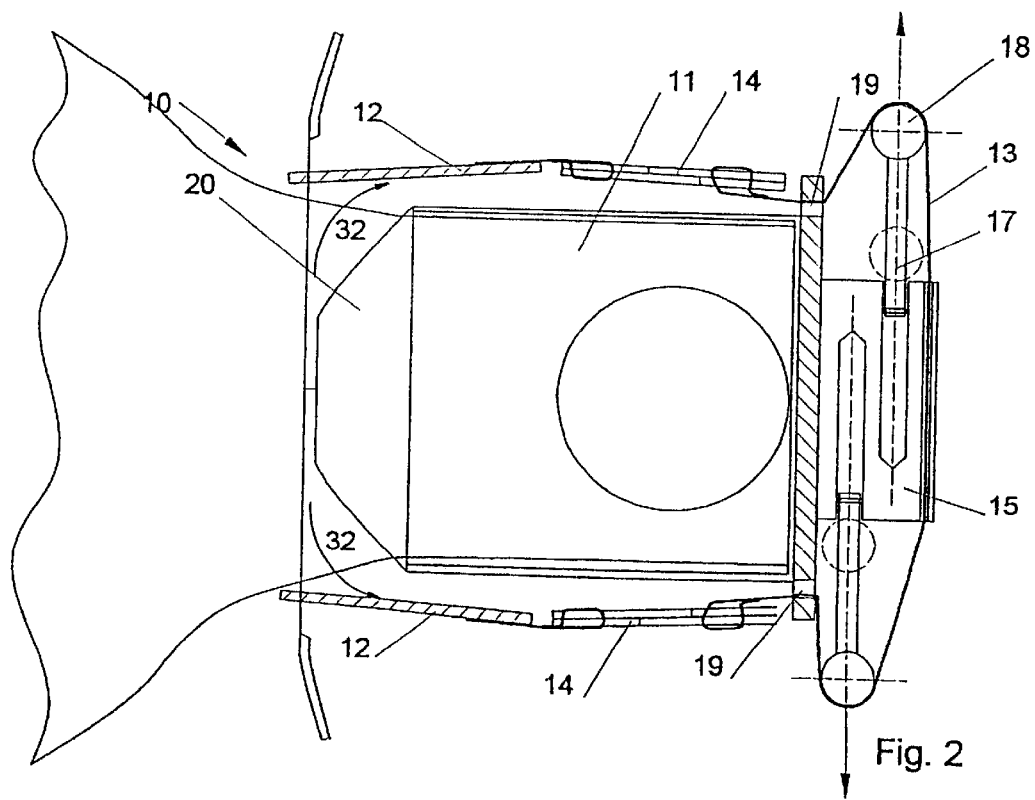
FIG. 2 is a top plan view in partial section of the one embodiment of the air bag module of the present invention and showing the drive mechanism in its actuated condition in which it has effected the movement of the deployment opening cover assemblies to thereby open the deployment opening of the air bag module through which the air bag is moved during the deployment of the air bag.

FIGS. 1 and 2 show, respectively, the one embodiment of the air bag module 10 of the present invention in its non-deployed condition in which the air bag sack has not been deployed and the one embodiment of the air bag module 10 in its deployed condition in which the air bag sack has been released and inflated. The air bag module 10 includes a module housing 11 in which a folded, not further illustrated air bag sack is located and on whose rear side is located a deployment opening which is closed in the non-deployed condition of the air bag module by a pair of cover elements 12. The cover elements can alternatively be located in the module housing or they can be comprised as part of the instrument panel or dashboard of a motor vehicle, whereby, in this latter configuration, the module housing 11 is secured behind the instrument panel.

Each end portion of a strap or cord-like pulling force transmitting element 13 is secured by a cover element connection to an outer end of a respective one of the cover elements 12, the pulling force transmitting element 13 extending around the module housing 11 and preferably being configured as a belt band. The belt band, to facilitate the installation thereof, comprises one end portion secured to the outer end of a respective one of the pair of the cover elements 12, a body portion extending along an extent of the module housing 11, and a length compensating element 14 interconnecting the one end portion and the body portion, the other end portion being secured to the outer end of the other one of the pair of the cover elements 12, another body portion extending along another extent of the module housing 11, and another length compensation element 14 interconnecting the other end portion and the other body portion.

A drive block 15 is mounted to the module housing 11 at the side thereof which is opposite to the deployment opening that is closed off by the cover elements 12, and the drive block 15 is located inwardly of the travel path of the pulling force transmitting element 13. In the illustrated embodiment of the air bag module, the interior of the drive block 15 has a pair of parallel planes in each of which is located a respective plurality of cylinder bores 16 and the drive pistons 17, each movably retained in a respective cylinder bore 16; the drive pistons 17 in one of the planes are driveable outwardly from their cylinder bores 16 toward one respective side of the drive block 15 and the drive pistons 17 of the other plane are driveable outwardly from their cylinder bores toward an opposite side of the drive block 15. The outer ends of each respective group of the drive pistons 17 are commonly connected to one of a pair of push bars 18. The pair of push bars 18 are disposed relative to the pulling force transmitting element 13 such that the push bars are moved from their broken line positions shown in FIG. 2 by the outward movement of the drive pistons 17 to consequently push against the pulling force transmitting element 13 and thereby place the pulling force transmitting element 13 in tension. Since the pulling force transmitting element 13 is trained through a pair of belt guides 19, each of which is fixedly secured to the module housing immediately adjacent a respective one of the push bars 18, the outward movement of the push bars 18 effects a looping of the pulling force transmitting element 13 with a corresponding shortening of its effective length (that is, a corresponding shortening of the direct line distance between the cover element connection of the pulling force transmitting element 13 and a reference location on the drive block 15) such that each of the pair of cover elements 12 is drawn along the outside of the module housing 11 in the respective direction shown by the arrows 32; this pulling and swinging movement is supported by a curtain or guide means 20 on the front side of the module housing 11.

Figure 3:
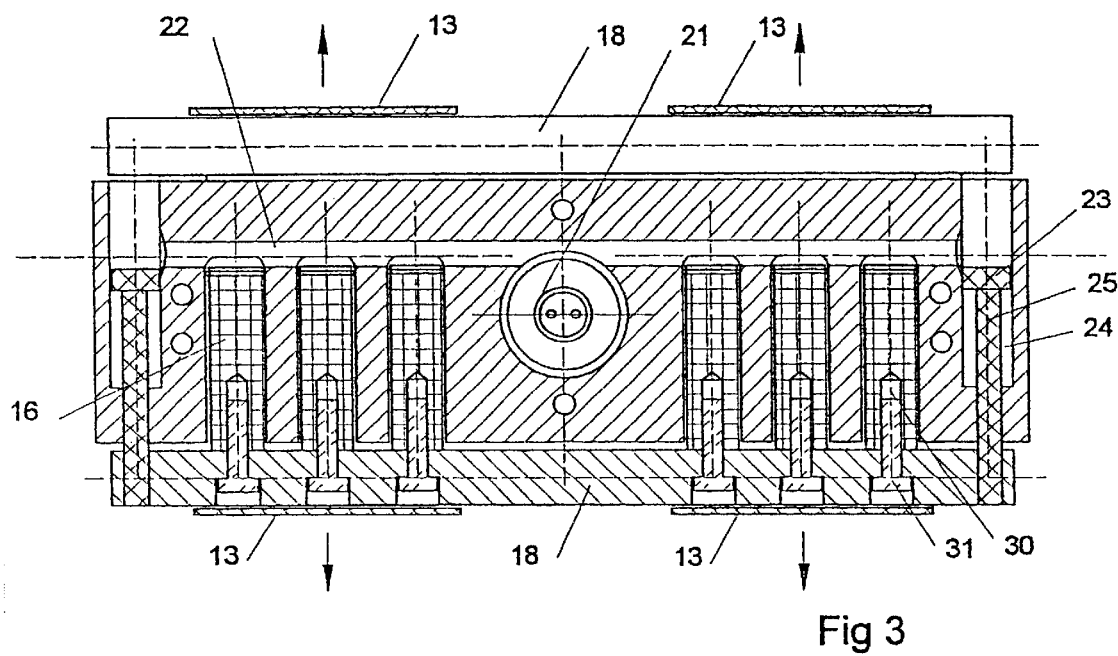
FIG. 3 is an enlarged sectional view of the drive block of the drive mechanism.

As can be seen in the respective views of the air bag module in FIGS. 1 and 3 or FIGS. 2 and 3, each cover element 12 is dimensioned with a width which takes into account the extent of travel which each of a pair of parallel extending pulling force transmitting elements 13 secured to the cover element undergoes in response to the common movement against the pulling force transmitting elements 13 of the push bars 18 as the push bars extend from the drive block 15 along the width of the module housing 11. Each push bar 18 is applied against an extent of the pulling force transmitting elements 13 by a respective pair of the drive piston series each comprising three drive pistons 17 extending outwardly from their associated cylinder bores 16. Each drive piston 17 includes a longitudinal bore 30 into which a respective bolt 31 is threaded to secure the drive piston to the associated push bar 18. To limit the outward movement of each push bar 18, a travel limit rod 25 is connected to each respective outer end of the push bar, each travel limit rod 25 being received in an associated bore 24 in the drive block 15 and having an enlarged head portion 23 for engaging a shoulder at the associated bore 24 to thereby stop the outward movement of the push bar 18. The individual cylinder bores 16 are commonly communicated via a pressurized fluid conduit in the form of a manifold 22 with a pressurized fluid source in the form of a gas generator 21.

Figure 4:
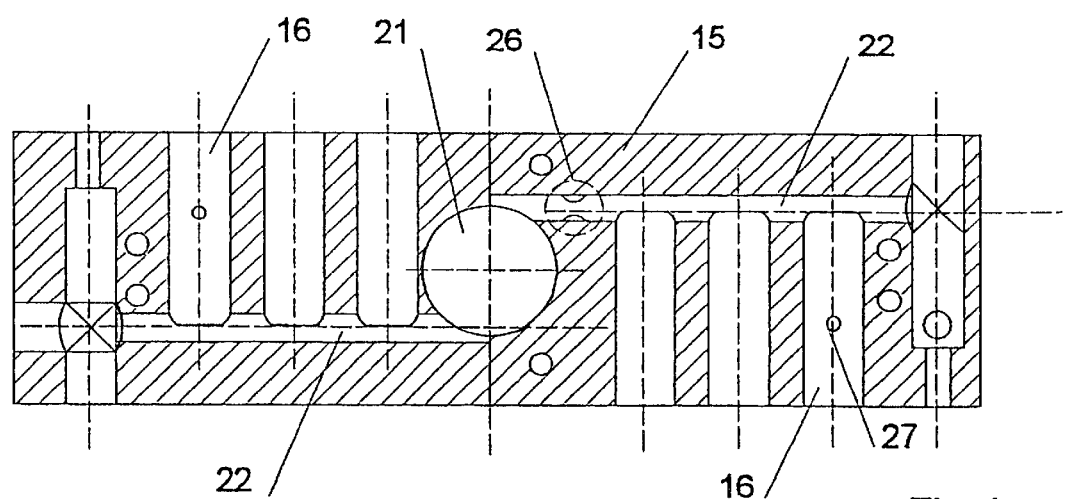
FIG. 4 is an enlarged sectional view of the drive block of the drive mechanism with the drive pistons and the rods not shown.

FIG. 4 shows an enlarged view in partial section of the drive block 15 in which the drive pistons and the push bars connected thereto are not shown; FIG. 4 illustrates a series of three cylinder bores 16 in the upper parallel plane respectively shown in FIGS. 1 and 2 whose associated drive pistons 17 drive one of the push bars 18 against the pulling force transmitting elements 13, and another series of three cylinder bores 16 in the lower parallel plane respectively shown in FIGS. 1 and 2 whose associated drive pistons 17 drive the other push bar 18 against the pulling force transmitting elements 13. A reduced cross section portion 26 can be provided in the manifold 22 either in one of the pair of parallel planes of the drive block 15 or, as viewed with respect to the symmetrical arrangement of the cylinder bores 16 relative to the gas generator 21, on only one side of the gas generator 21, for increasing the effective system pressure of the area of the drive block 15 at the constriction. Overflow openings 27 are provided each in a respective cylinder bore 16 at a spacing from the manifold 22 which, after the passage of the associated drive piston 17 past it, releases the piston driving air from the cylinder bore so as to thereby render the cylinder bore into a non-pressurized condition; in this manner, it is possible to control the outward movement of the push bars 18 and the corresponding pushing force exerted by the push bars.

The specification incorporates by reference the disclosure of German priority document 100 10 589.0 of Mar. 3, 2000.

The present invention is, of course, in no way restricted to the specific disclosure of the specification and drawings, but also encompasses any modifications within the scope of the appended claims.

What is claimed is:

1. A passenger seat air bag module for supporting and deploying an air bag sack at a location relative to the instrument panel of a vehicle, comprising:

a housing;

an air bag sack;

a gas generator for generating gas for inflating the air bag sack;

a cover element for covering a deployment opening through which the air bag sack moves when it is deployed;

a pulling force transmitting element having one portion connected to the cover element by a cover element connection and another portion retained at an anchor location spaced from the cover element connection; and a drive mechanism for withdrawing the cover element from its deployment opening cover position into a withdrawn position relatively behind the instrument panel, the drive mechanism including:

a drive block having a plurality of paired cylinder bores and drive pistons each of which includes a cylinder bore formed in the drive block and a drive piston movably retained in the cylinder bore and having a pressurized fluid conduit for communicating the cylinder bores with a source of pressurized fluid such that each drive piston is driveable outwardly of its associated cylinder bore in response to the introduction of pressurized fluid into the cylinder bore, the drive block being disposed relatively between the cover element connection and the anchor location of the pulling force transmitting element such that the pulling force transmitting element, between its cover element connection and its anchor location, is trained along a portion of the drive block, and a push bar located at the portion of the drive block along which the pulling force transmitting element is trained, the push bar being engaged by the drive pistons such that the push bar is moved outwardly relative to the drive block upon extension of the drive pistons from their cylinder bores, the outward movement of the push bar effecting withdrawal of the cover element from its deployment opening covering position to its withdrawn position by the pulling force transmitting element due to a shortening of the effective length of the pulling force transmitting element between its anchor location and its cover element connection.

2. A passenger seat air bag module according to claim 1, wherein the drive block is mounted to the housing.

3. A passenger seat air bag module according to claim 1, wherein the pressurized fluid conduit includes a reduced cross section portion operable to increase the pressure of the fluid flowed therethrough.

4. A passenger seat air bag module according to claim 1, and further comprising an overflow opening each formed in a respective cylinder bore at a spacing from the junction of the respective cylinder bore and the pressurized fluid conduit such that the cylinder bore is disposed in a non-pressurized condition following the passage of the associated drive piston in the respective cylinder bore past the overflow opening.

5. A passenger seat air bag module according to claim 1, and further comprising a travel limit element for stopping the outward travel of the push bar once the push bar has traveled outwardly a predetermined distance.

6. A passenger seat air bag module according to claim 1, and further comprising a second pulling force transmitting element connected to the cover element and disposed relative to the drive mechanism such that the second pulling force transmitting element exerts a withdrawal force on the cover element in response to the movement of a push bar of the drive mechanism against the second pulling force transmitting element.

7. A passenger seat air bag module according to claim 1, wherein the pulling force transmitting element is trained along a portion of the push bar and the drive pistons engage the push bar coincident with the portion thereof along which the pulling force transmitting element is trained.

8. A passenger seat air bag module according to claim 1, wherein the pressurized fluid source is disposed centrally in the drive block and the cylinder bores are symmetrically located with respect to the pressurized fluid source.

9. A passenger seat air bag module according to claim 1, and further comprising a second cover element, the pair of cover elements cooperating together to cover the deployment opening, and the pulling force transmitting element being connected to the second panel for withdrawing the second panel from its deployment opening covering position to a withdrawn position.

10. A passenger seat air bag module according to claim 1, and further comprising a second push bar disposed for engagement by at least one drive piston to be moved outwardly relative to the drive block so as to thereby effect a shortening of the effective length of the pulling force transmitting element, the pair of push bars being movable outwardly in their respective outward movement directions relative to the drive block, and the outward movement directions of the pair of push bars being opposite to one another.

11. A passenger seat air bag module according to claim 1, wherein the pulling force transmitting element is disposed such that a loop in the pulling force transmitting element is created in response to movement of the push bar against the pulling force transmitting element.

* * * * *